US012802233B2

(12) United States Patent
Meitav et al.

(10) Patent No.: US 12,802,233 B2
(45) Date of Patent: Nov. 17, 2026

(54) CROPPING VOLUMETRIC IMAGE OF REGION OF INTEREST FROM THREE-DIMENSIONAL ULTRASOUND IMAGE

(71) Applicant: BIOSENSE WEBSTER (ISRAEL) LTD., Yokneam (IL)

(72) Inventors: Shaked Meitav, Atlit (IL); Hanna Cohen-Sacomsky, Zichron Ya'acov (IL); Tatiana Surujon, Haifa (IL); Shir Kolangi Yosub, Yokneam Ilit (IL); Guy Wekselman, Tel Aviv (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 449 days.

(21) Appl. No.: 18/086,316

(22) Filed: Dec. 21, 2022

(65) Prior Publication Data

US 2024/0212157 A1 Jun. 27, 2024

(51) Int. Cl.
*G06T 7/11* (2017.01)
*G06T 7/149* (2017.01)
(Continued)

(52) U.S. Cl.
CPC ................ *G06T 7/11* (2017.01); *G06T 7/149* (2017.01); *G06T 15/08* (2013.01); *G06T 19/20* (2013.01);
(Continued)

(58) Field of Classification Search
CPC ........... G06T 15/08; G06T 2207/10136; G06T 2207/20132; G06T 7/11;
(Continued)

(56) References Cited

U.S. PATENT DOCUMENTS

| | | | |
|---|---|---|---|
| 5,443,489 | A | 8/1995 | Ben-Haim |
| 5,539,199 | A | 7/1996 | Ruckh et al. |

(Continued)

FOREIGN PATENT DOCUMENTS

| | | |
|---|---|---|
| WO | WO 2015/044901 | 4/2015 |
| WO | WO 2018/222471 | 12/2018 |
| WO | WO 2021/037864 | 3/2021 |

OTHER PUBLICATIONS

Cong, Weijian et al. âGlobal Patch Matching (GPM) for freehand 3D ultrasound reconstruction.â Biomedical engineering online vol. 16,1 124. Oct. 30, 2017 (Year: 2017).*

(Continued)

*Primary Examiner* — Chan S Park
*Assistant Examiner* — Chandhana Pedapati
(74) *Attorney, Agent, or Firm* — Smith, Gambrell & Russell LLP

(57) ABSTRACT

A system includes a processor and a display. The processor is configured to: (i) receive a first three-dimensional (3D) ultrasound (US) image of a volume of an organ of a patient, (ii) present at least first and second two-dimensional (2D) slices selected in the first 3D US image, (iii) receive first and second 2D contours including a region of interest (ROI) in the volume of the organ, which are selected in the first and second 2D slices, respectively, and (iv) produce, based on the first and second 2D contours, a second 3D US image of the ROI. The display is configured to present the second 3D US image to a user.

20 Claims, 4 Drawing Sheets

(51) Int. Cl.
*G06T 15/08* (2011.01)
*G06T 19/20* (2011.01)

(52) U.S. Cl.
CPC ............... *G06T 2207/10016* (2013.01); *G06T 2207/10136* (2013.01); *G06T 2207/20132* (2013.01); *G06T 2207/30048* (2013.01); *G06T 2219/2016* (2013.01)

(58) Field of Classification Search
CPC ....... G06T 2207/30048; G06T 2210/22; G06T 7/149; G06T 19/20; G06T 2207/10016; G06T 2219/2016; G06T 2207/30101; G06T 19/00; G06T 2210/41; G06T 7/12; A61B 8/12; A61B 8/523; A61B 8/483; A61B 8/466; A61B 8/469; A61B 8/0883
See application file for complete search history.

(56) References Cited

U.S. PATENT DOCUMENTS

| | | | | |
|---|---|---|---|---|
| 5,558,091 | A | 9/1996 | Acker et al. | |
| 6,172,499 | B1 | 1/2001 | Ashe | |
| 6,239,724 | B1 | 5/2001 | Doron et al. | |
| 6,332,089 | B1 | 12/2001 | Acker et al. | |
| 6,484,118 | B1 | 11/2002 | Govari | |
| 6,618,612 | B1 | 9/2003 | Acker et al. | |
| 6,690,963 | B2 | 2/2004 | Ben-Haim et al. | |
| 6,788,967 | B2 | 9/2004 | Ben-Haim et al. | |
| 6,892,091 | B1 | 5/2005 | Ben-Haim et al. | |
| 7,536,218 | B2 | 5/2009 | Govari et al. | |
| 7,656,418 | B2 | 2/2010 | Watkins et al. | |
| 7,756,576 | B2 | 7/2010 | Levin | |
| 7,848,787 | B2 | 12/2010 | Osadchy | |
| 7,869,865 | B2 | 1/2011 | Govari et al. | |
| 7,894,663 | B2 * | 2/2011 | Berg | A61B 8/00 382/128 |
| 8,057,394 | B2 | 11/2011 | Dala-Krishna | |
| 8,456,182 | B2 | 6/2013 | Bar-Tal et al. | |
| 2006/0241445 | A1 | 10/2006 | Altmann et al. | |
| 2006/0253024 | A1 | 11/2006 | Altmann et al. | |
| 2009/0003665 | A1 * | 1/2009 | Berg | A61B 8/00 382/128 |
| 2009/0148012 | A1 * | 6/2009 | Altmann | A61B 5/061 600/407 |
| 2011/0144499 | A1 | 6/2011 | Yoo et al. | |
| 2012/0245465 | A1 * | 9/2012 | Hansegard | A61B 8/466 600/443 |
| 2016/0125640 | A1 * | 5/2016 | Lee | A61B 8/463 600/443 |
| 2016/0140751 | A1 * | 5/2016 | Jafarkhani | A61B 8/466 382/131 |
| 2019/0272667 | A1 * | 9/2019 | Roundhill | G06T 19/00 |
| 2024/0000430 | A1 * | 1/2024 | Chen | A61B 8/466 |

OTHER PUBLICATIONS

Zhang, Qi et al. âVolume visualization: a technical overview with a focus on medical applications.â Journal of digital imaging vol. 24,4 (2011) (Year: 2011).*

Heckel, Frank et al. "Interactive 3D medical image segmentation with energy-minimizing implicit functions". Computers & Graphics, vol. 35(2), 2011, pp. 275-287, ISSN 0097-8493, https://doi.org/10.1016/j.cag.2010.12.006. (Year: 2011).*

Kort (Kort, Anne E. [The Virtual Paleontologist]. (Jun. 24, 2020) Cropping Volumes in 3D Slicer | Introduction to Digital Preparation Video 10 [Video]. YouTube. https://www.youtube.com/watch?v=GgPRsQYkGbc). (Year: 2020).*

International search Report and written opinion received for PCT application No. PCT/IB2023/061785, mailed on Jan. 29, 2024, 11 pages.

* cited by examiner

CROPPING VOLUMETRIC IMAGE OF REGION OF INTEREST FROM THREE-DIMENSIONAL ULTRASOUND IMAGE

FIELD OF THE DISCLOSURE

The present disclosure relates generally to medical devices, and particularly to methods and systems for improving the three-dimensional (3D) visualization of a region of interest (ROI) in patient heart, using an intracardiac ultrasound catheter.

BACKGROUND OF THE DISCLOSURE

Various techniques have been developed for producing volumetric ultrasound (US) images in organs, such as in a heart, using an US catheter. In some cases, the US images cannot provide a user with sufficient information on a region of interest (ROI) in the patient heart.

The present disclosure will be more fully understood from the following detailed description of the examples thereof, taken together with the drawings in which:

DETAILED DESCRIPTION OF EXAMPLES

Overview

Figure 1:
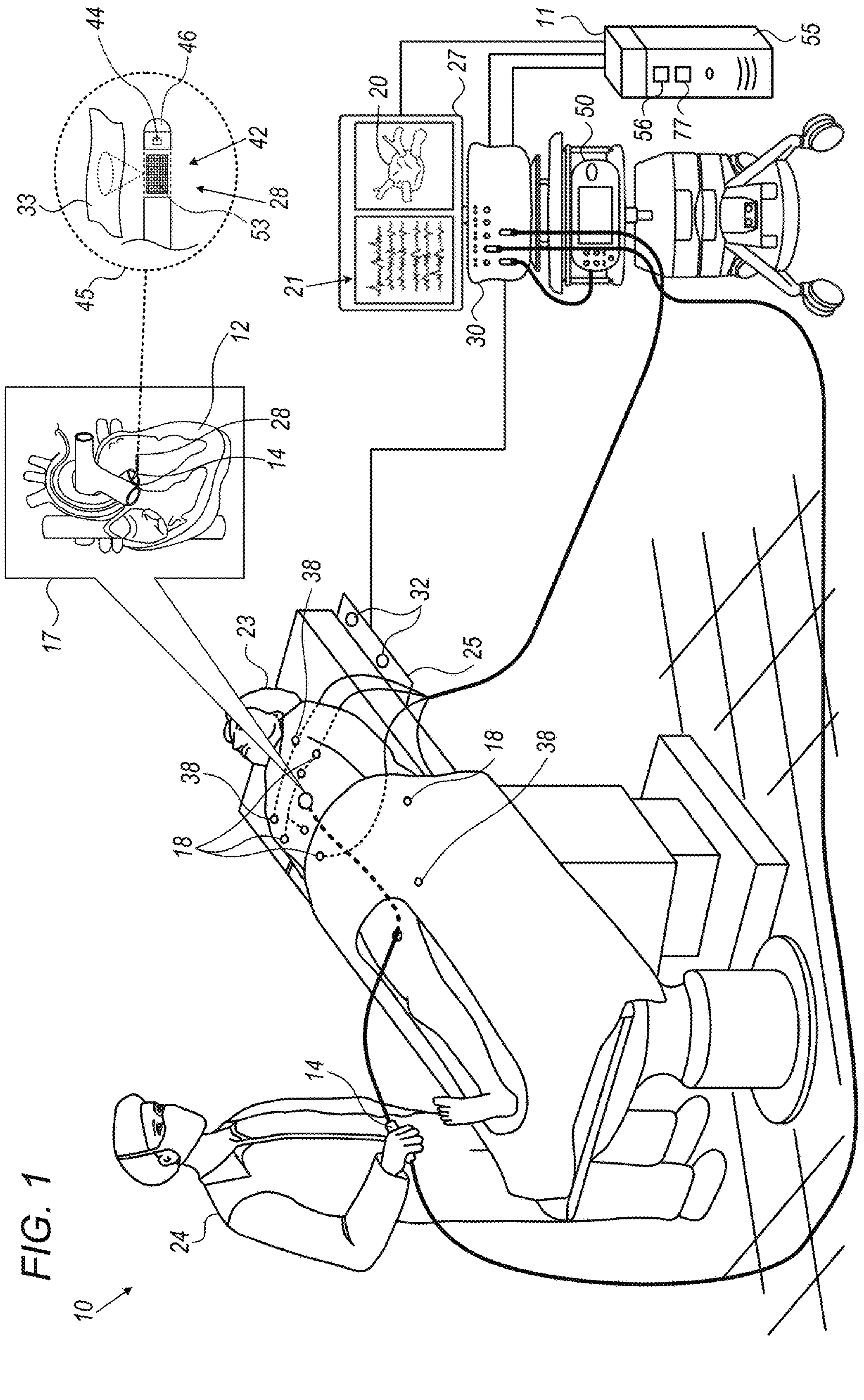
FIG. 1 is a schematic, pictorial illustration of a catheter-based ultrasound (US) imaging and tissue ablation system, in accordance with an example of the present disclosure.

Catheters having imaging capabilities, such as ultrasound (US) imaging, are being used for imaging tissues and cavities within organs of a patient, such as in a patient heart. For example, the catheter-based four-dimensional (4D) intracardiac echocardiography (ICE) is a unique imaging to provide high-resolution real-time modality able visualization of cardiac structures within the heart. The term 4D refers to acquisition of three-dimensional images over time, which is enabled by continuous monitoring of catheter location. Such techniques provide a user with early detection of anatomical problems within the heart as well as complications occurred during and after a treatment procedure carried out in the heart or another organ in question.

The 4D visualization typically produces a plurality of pyramid-shaped 3D images, but in some cases, the US images cannot provide the user with sufficient and clean information on a ROI in the patient heart. More specifically, the pyramid-shaped 3D image typically contains a volume larger than the volume of interest, and therefore, may obstruct and/or obscure anatomical features of interest. Moreover, due to the 3D nature of the heart anatomy it is difficult to crop, from the 4D visualization, one or more 3D images containing only the useful and required information.

Examples of the present disclosure that are described below, provide techniques for cropping a volume of interest from a 4D ICE visualization of the heart.

In some examples, a catheter-based ultrasound imaging and tissue ablation system comprises a catheter, a processor and a display device, also referred to herein as a display, for brevity.

In some examples, the catheter comprises an ultrasound catheter (e.g., a 4D ICE catheter) with a distal tip having ultrasound transducers, which are configured to apply US waves to tissue (e.g., of a wall) of the heart. The distal tip is configured to produce, based on US waves returned (e.g., reflected) from the tissue in question, one or more US signals indicative of the shape and morphology of the tissue in question.

In some examples, the catheter comprises a position sensor coupled to the distal tip and configured to produce position signals indicative of the position and orientation of the distal tip in the patient heart. The components of the catheter are described in more detail in FIG. 1 below.

In some examples, the processor is configured to receive (e.g., from the US catheter) a first 3D US image of a volume of the heart (or any other organ) of the patient, and to present to a user at least first and second two-dimensional (2D) slices selected in the first 3D US image.

In some examples, the processor is configured to receive or produce first and second 2D contours comprising a region of interest (ROI) in the volume of the organ, which are selected in the first and second 2D slices, respectively. The selected contours may be selected manually, e.g., by a physician or any other user of the system, or automatically by the processor. For example, in the 2D slices, the user may select a rectangle surrounding the region of interest, and the processor is configured to apply an auto-contour algorithm, which is configured to identify the appropriate contour based on the position of the rectangle selected by the user.

In some examples, based on the first and second 2D contours, the processor is configured to produce a second 3D US image of the ROI, which is a sub-volume of the first 3D US image. In other words, based on the 2D contours, the processor is configured to crop, from the first 3D US image received from the US catheter, the second 3D US image containing mostly the volume of interest within the heart.

In some examples, the display is configured to present, to the user, the second 3D US image that has at least the volume of interest.

The disclosed techniques improve the 3D visualization of tissues and ROIs within an organ of a patient, and thereby, improve the quality of medical procedures carried out on the organ in question using the 3D visualization.

SYSTEM DESCRIPTION

FIG. 1 is a schematic, pictorial illustration of a catheter-based ultrasound imaging and tissue ablation system 10, in accordance with an example of the present disclosure.

In some examples, system 10 may include multiple catheters, which are percutaneously inserted by a physician 24 through the patient's vascular system into a chamber or vascular structure of a heart 12. Typically, a delivery sheath catheter is inserted into a chamber in question, near a desired location in heart 12. Thereafter, one or more catheters can be inserted into the delivery sheath catheter so as to arrive at the desired location within heart 12. The plurality of catheters may include catheters dedicated for sensing Intracardiac Electrogram (IEGM) signals, catheters dedicated for ablating, catheters adapted to carry out both sensing and ablating, and catheters configured to perform imaging of tissues (e.g., tissue 33) of heart 12.

Reference is now made to an inset 17 showing a catheter 14 and a sectional view of heart 12. In some examples, physician 24 may place a distal tip 28 of catheter 14 in close proximity with or contact with the heart wall for performing diagnostics (e.g., imaging and/or sensing) and/or treatment (e.g., tissue ablation) in a target (e.g., ablation) site in heart 12. Additionally, or alternatively, for ablation, physician 24 would similarly place a distal end of an ablation catheter in contact with a target site for ablating tissue intended to be ablated. In the present example shown in inset 17, distal tip 28 is positioned in front of tissue 33 of heart 12.

Reference is now made to an inset 45 showing distal tip 28. In some examples, distal tip 28 comprises a four-dimensional (4D) ultrasound (US) catheter with distal tip 28 having ultrasound transducers 53, which are arranged in a two-dimensional (2D) array 42 and are configured to apply US waves to tissue 33 (and or any other area of heart 12).

In the present example, 2D array 42 comprises about 32×64 US transducers 53 (or any other suitable number of US transducers 53 arranged in any suitable structure), and is configured to produce US-based images of at least tissue 33 located at an inner wall of heart 12.

In some examples, distal tip 28 comprises a position sensor 44 embedded in or near distal tip 28 for tracking position and orientation of distal tip 28 in a coordinate system of system 10. More specifically, position sensor 44 is configured to output position signals indicative of the position and orientation of 2D array 42 inside heart 12. Based on the position signals, a processor 77 of system 10 is configured to display the position and orientation of distal tip 28 over an anatomical map 20 of heart 12, as will be described in more detail below. Optionally and preferably, position sensor 44 comprises a magnetic-based position sensor including three magnetic coils for sensing three-dimensional (3D) position and orientation. The position tracking components of system 10 are described in more detail below.

In some examples, distal tip 28 may be further used to perform the aforementioned diagnostics and/or therapy, such as electrical sensing and/or ablation of tissue 33 in heart 12, using, for example, a tip electrode 46. In the present example, tip electrode 46 may comprise a sensing electrode or an ablation electrode.

In other examples, system 10 may comprise another catheter (not shown) inserted into heart 12 that may have one and preferably multiple electrodes optionally distributed along the distal tip of the respective catheter. The electrodes are configured to sense the IEGM signals and/or electrocardiogram (ECG) signals in tissue 33 of heart 12.

Reference is now made back to the general view of FIG. 1. In some examples, magnetic based position sensor 44 may be operated together with a location pad 25 including a plurality of (e.g., three) magnetic coils 32 configured to generate a plurality of (e.g., three) magnetic fields in a predefined working volume. Real time position of distal tip 28 of catheter 14 may be tracked based on magnetic fields generated with location pad 25 and sensed by magnetic based position sensor 44. Details of the magnetic based position sensing technology are described, for example, in U.S. Pat. Nos. 5,539,199; 5,443,489; 5,558,091; 6,172,499; 6,239,724; 6,332,089; 6,484,118; 6,618,612; 6,690,963; 6,788,967; 6,892,091.

In some examples, system 10 includes one or more electrode patches 38 positioned for skin contact on patient 23 to establish location reference for location pad 25 as well as impedance-based tracking of electrodes (not shown). For impedance-based tracking, electrical current is directed toward electrode 46, and/or to other electrodes (not shown) of catheter 14, and sensed at electrode skin patches 38 so that the location of each electrode (e.g., electrode 46) can be triangulated via the electrode patches 38. This technique is also referred to herein as Advanced Current Location (ACL) and details of the impedance-based location tracking technology are described in U.S. Pat. Nos. 7,536,218; 7,756,576; 7,848,787; 7,869, 865; and 8,456, 182.

In some examples, the magnetic based position sensing and the ACL may be applied concurrently, e.g., for improving the position sensing of one or more electrodes coupled to a shaft of a rigid catheter or to flexible arms or splines at the distal tip of another sort of catheter, such as basket catheter 14, and the PentaRay® or OPTRELL® catheters, available from Biosense Webster, Inc., 31A Technology Drive, Irvine, CA 92618.

In some examples, a recorder 11 displays electrograms 21 captured with body surface ECG electrodes 18 and intracardiac electrograms (IEGM) captured, e.g., with electrode 46 of catheter 14. Recorder 11 may include pacing capability for pacing the heart rhythm and/or may be electrically connected to a standalone pacer.

In some examples, system 10 may include an ablation energy generator 50 that is adapted to conduct ablative energy to one or more of electrodes at a distal tip of a catheter configured for ablating. Energy produced by ablation energy generator 50 may include, but is not limited to, radiofrequency (RF) energy or pulse trains of pulsed-field ablation (PFA) energy, including monopolar or bipolar high-voltage DC pulses as may be used to effect irreversible electroporation (IRE), or combinations thereof. In another example, electrode 46 may comprise an ablation electrode, positioned at distal tip 28 and configured to apply the RF energy and/or the pulse trains of PFA energy to tissue of the wall of heart 12.

In some examples, patient interface unit (PIU) 30 is an interface configured to establish electrical communication between catheters, electrophysiological equipment, power supply and a workstation 55 for controlling the operation of system 10.

Electrophysiological equipment of system 10 may include for example, multiple catheters, location pad 25, body surface ECG electrodes 18, electrode patches 38, ablation energy generator 50, and recorder 11. Optionally and preferably, PIU additionally includes processing capability for implementing real-time computations of location of the catheters and for performing ECG calculations.

In an example, one or more electrodes (e.g., electrode 46) are configured to receive electrical current from PIU 30, and impedance is measured between at least one of the electrodes (e.g., electrode 46) and (i) a respective electrode patch 38, or (ii) a respective body surface ECG electrode 18.

In some examples, workstation 55 includes a storage device, processor 77 with suitable random-access memory, or storage with appropriate operating software stored therein, an interface 56 configured to exchange signals of data (e.g., between processor 77 and another entity of system 10) and user interface capability. In an example, processor 77 is configured to produce a signal indicative of an electrophysiological (EP) property of heart 12. For example, (i) a first a signal indicative of electrical potential measured on the tissue in question having one or more electrodes, such as electrode 46 or sensing electrodes of a sensing catheter (not shown) placed in contact therewith, and (ii) a second signal indicative of the measured impedance described above. Workstation 55 may provide multiple functions, optionally including (1) modeling the endocardial anatomy in three-dimensions (3D) and rendering the model or anatomical map 20 for display on a display device 27 (also referred to herein as a display, for brevity), (2) displaying on display device 27 activation sequences (or other data) compiled from recorded electrograms 21 in representative visual indicia or imagery superimposed on the rendered anatomical map 20, (3) displaying real-time location and orientation of multiple catheters within the heart chamber, and (4) displaying on display device 27 anatomical images (e.g., ultrasound images) of sites of interest, such as places where ablation energy has been applied, or intended to be applied.

Reference is now made back to inset 45. In some examples, processor 77 is configured to control distal tip 28 of catheter 14 to: (i) apply ultrasound (US) waves to tissue 33, and (ii) produce signals indicative of the (a) US waves returned from tissue 33, and (b) position signals indicative of the position and orientation of distal tip 28 in the coordinate system of system 10.

One commercial product embodying elements of the system is available as the CARTO™ System, available from Biosense Webster, Inc., 31A Technology Drive, Irvine, CA 92618.

Figure 2B:
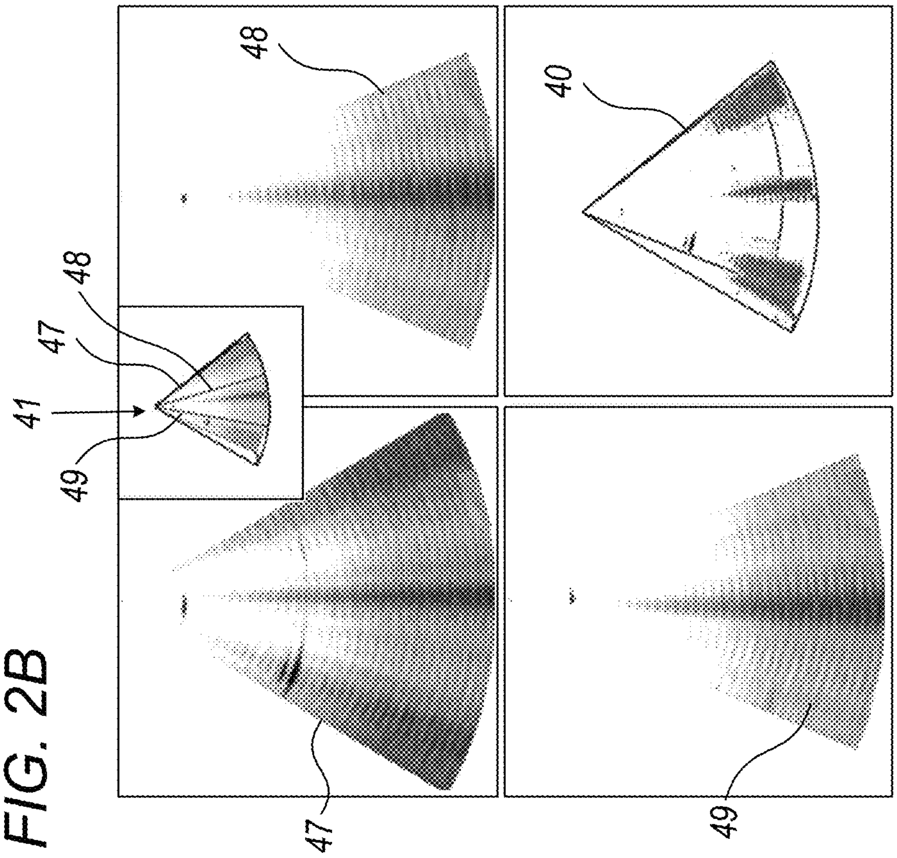
FIG. 2B is a schematic, pictorial illustration of the selected 2D slices of FIG. 2A above that are presented to a user, in accordance with an example of the present disclosure.
Figure 2A:
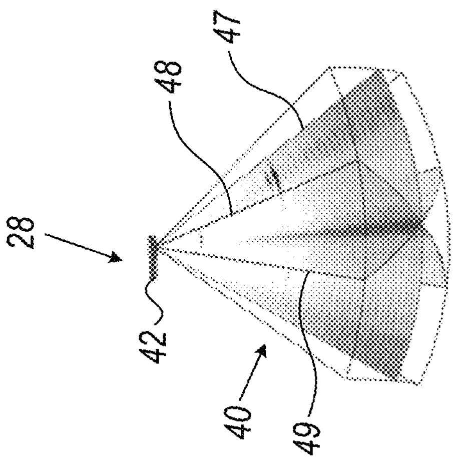
FIG. 2A is a schematic, pictorial illustration of a first three-dimensional (3D) US image of heart tissue and two-dimensional (2D) slices selected in the first 3D US image, in accordance with an example of the present disclosure.

FIG. 2A is a schematic, pictorial illustration of a first three-dimensional (3D) US image 40 of tissue (e.g., tissue 33 shown in FIG. 1 above) of heart 12, and two-dimensional (2D) slices 47, 48 and 49 that are selected in first 3D US image 40, in accordance with an example of the present disclosure.

In some examples, 2D array 42 of distal tip 28 applies the US waves to a cavity and tissue in question in heart 12 and receives the waves returned from the tissue and/or the cavity, as described in FIG. 1 above. Based on the returned US waves, processor 77 is configured to produce 3D US image (also referred to herein as first 3D US image 40) comprising at least a volume of interest (shown and described in FIG. 3B below).

In some examples, processor 77 is configured to select 2D slices 47-49 within the volume of 3D US image 40. Alternatively, at least one of 2D slices 47-49 may be selected manually by physician 24. Typically, physician 24 selects the relevant 2D slices based on any suitable clinical criterion.

FIG. 2B is a schematic, pictorial illustration of 2D slices 47-49 that are presented to physician 24 (or any other user of system 10), in accordance with an example of the present disclosure.

In the example of FIG. 2B, processor 77 is configured to present 2D slices 47-49 side-by-side over display device 27, so that physician 24 can view anatomical features that may appear in two or more of 2D slices 47-49, as well as other anatomical features of heart 12. Moreover, processor 77 is configured to present first 3D US image 40 together with the presentation of 2D slices 47-49. Furthermore, processor 77 is configured to present a 3D US image 41 comprising only the selected 2D slices, in the present example, slices 47-49.

In some examples, in response to instructions from physician 24, processor 77 is configured to rotate one or both 3D US images and 41, and optionally, the corresponding orientation of the rotated 2D slices 47-49.

Figure 3B:
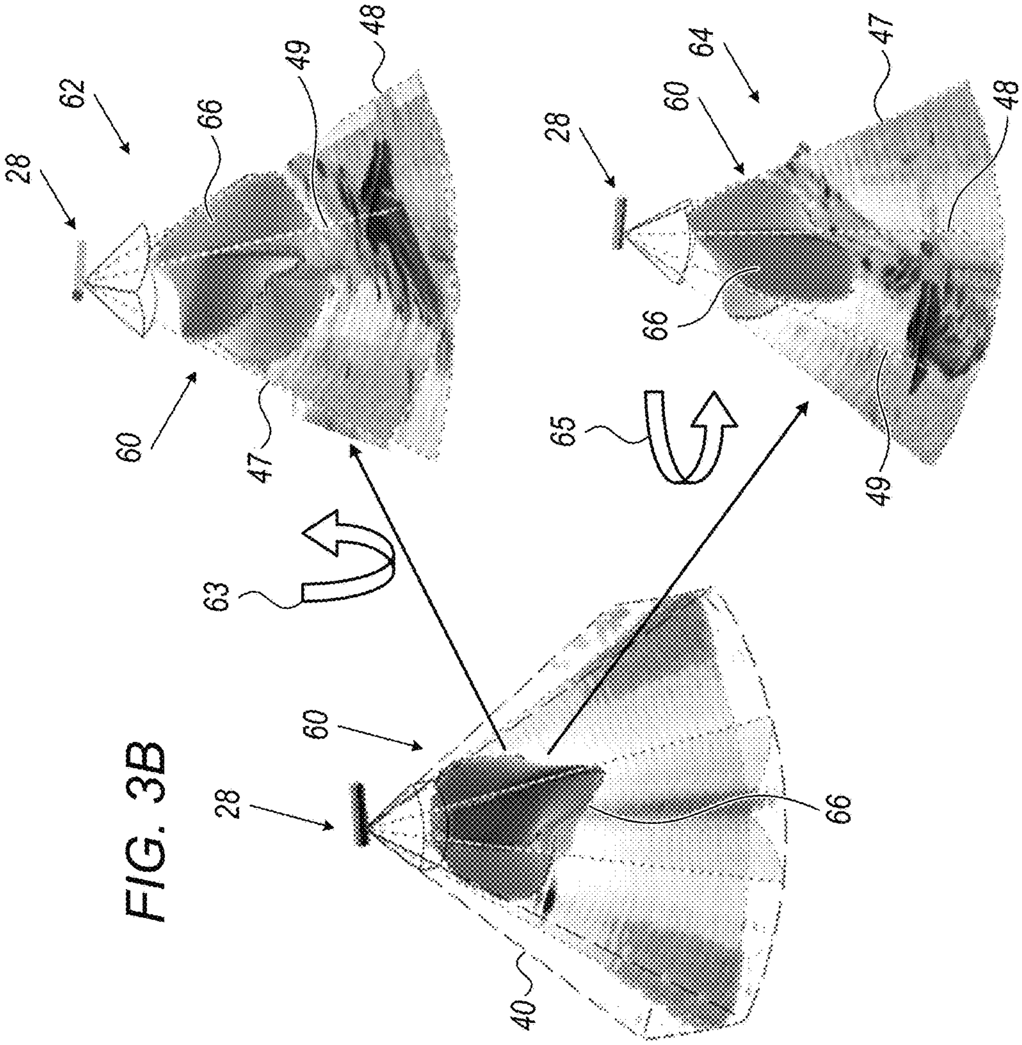
FIG. 3B is a schematic, pictorial illustration of a second 3D US image, which is a sub-volume of the first 3D US image, and comprises the ROI derived from the contours selected in the 2D slices of FIG. 3A above, in accordance with an example of the present disclosure.
Figure 3A:
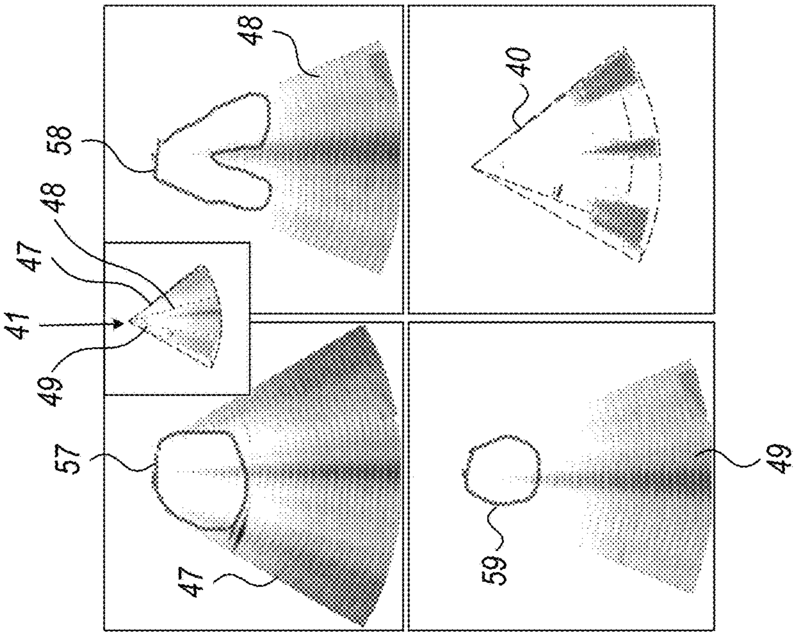
FIG. 3A is a schematic, pictorial illustration of a contour, which is produced in each of the selected 2D slices, and is indicative of a region of interest (ROI) in the heart tissue, in accordance with an example of the present disclosure.

FIG. 3A is a schematic, pictorial illustration of contours 57, 58 and 59, which are produced in 2D slices 47, 48, and 49, respectively, and are indicative of a region of interest (ROI) in heart 12, in accordance with an example of the present disclosure.

In some examples, processor 77 is configured to automatically produce at least one of contours 57-59, and to present them over 2D slices 47-49, respectively. For example, in two or more of 2D slices 47-49, physician 24 may select a rectangle surrounding the ROI, and processor 77 is configured to apply a suitable image processing algorithm, such as but not limited to an auto-contour algorithm, which is configured to identify the appropriate contour, such as contours 57-59, based on the position of the rectangle selected by physician 24. In other examples, processor 77 may apply any other suitable algorithm for identifying contours 57-59 in 2D slices 47-49, respectively.

In other examples, at least one of contours 57-59 may be produced by a user of system 10. For example, physician 24 may define one or more of contours 57-59 by drawing them over one or more of 2D slices 47-49, respectively.

Note that in both example implementations, after the definition/selection/production of contours 57-59, processor 77 is configured to present them over display device 27, or over any other display, so that physician could review the selected contours 57-59 over 2D slices 47-49, respectively.

In some examples, processor 77 is further configured to present 3D US image 40 together with 2D slices 47-49. For example, the orientation of 3D US image 40 may correspond to all of 2D slices 47-49.

FIG. 3B is a schematic, pictorial illustration of a second 3D US image 60, which is a sub-volume of first 3D US image 40, and comprises a volumetric ROI 66 derived from contours 57-59 selected in 2D slices 47-49 of FIG. 3A above, in accordance with an example of the present disclosure.

In some examples, processor 77 is configured to display (e.g., on display device 27) ROI 66 of 3D US image 60 as a sub-volume of 3D US image 40. Note that processor 77 is configured to produce volumetric ROI 66 (or any other suitable volumetric ROI) using at least two contours of the respective 2D slices. For example, another volumetric ROI may be produced using contours 57 and 58 of 2D slices 47 and 48, respectively.

In additional, or alternative examples, processor 77 is configured to present only or mostly ROI 66 in 3D US image 60, e.g., without the entire volume of 3D US image 40. Moreover, in response to instructions received from physician 24 (or any other user of system 10), processor 77 is configured to rotate 3D US image 60, so that physician 24 is able to see ROI 66 from various directions and orientations. For example, in a 3D US image 62 processor 77 is configured to rotate 3D US image 60 in a direction 63 to see the ROI from a first perspective, and in a 3D US image 64 processor 77 is configured to rotate 3D US image 60 in a direction 65 to see the ROI from a second perspective, different from the first perspective.

In some examples, processor 77 is configured to present in at least one of 3D US images 60, 62 and 64 of FIG. 3B (displayed on display device 27), distal tip 28 and one or more markers indicative of the selected 2D slices, such as slices 47-49 shown in FIGS. 2A, 2B and 3A above. The marker (s) may be presented in dashed lines as shown in FIG. 3B, or in solid lines, or using any other suitable presentation that may assist physician 24 to identify the selected 2D slices and contours within the respective 3D US image, such as in at least one of 3D US images 60, 62 and 64.

The examples of FIGS. 2A, 2B, 3A and 3B are shown by way of examples, and in other examples, processor 77 may receive any other suitable 3D images (e.g., other than ultrasound-based) of heart 12 or any other suitable organ, and apply the techniques described above (e.g., selection of 2D slices and contours, and production of the subsequent 3D image having the volumetric ROI) for presenting to a user the volumetric ROI.

Figure 4:
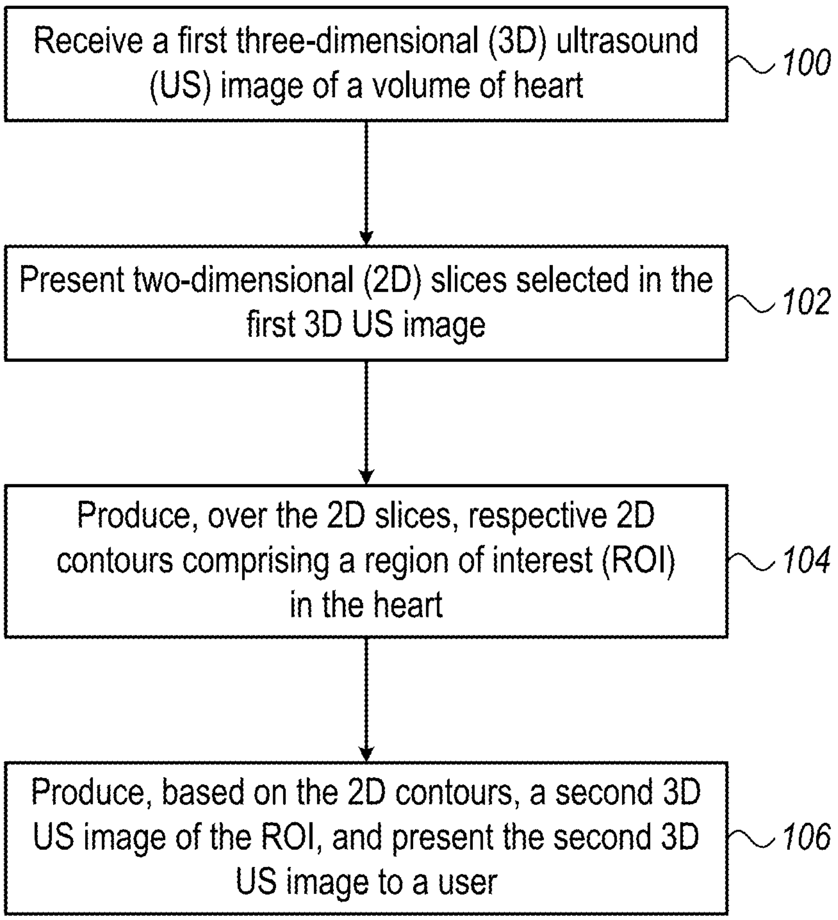
FIG. 4 is a flow chart that schematically illustrates a method for cropping a volumetric image of a region of interest (ROI) in the heart from the 3D US images, in accordance with an example of the present disclosure.

FIG. 4 is a flow chart that schematically illustrates a method for cropping volumetric image 60 of ROI 66 in heart 12 from 3D US image 40, in accordance with an example of the present disclosure.

The method begins at a first 3D US image receiving step 100, with processor 77 receiving 3D US image 40 of a volume of heart 12, as described in detail in FIG. 2A above. In other examples, instead of receiving 3D US image 40, processor 77 is configured to produce 3D US image 40 based on signals received from distal tip 28, wherein the signals are indicative of the US waves sensed by 2D array 42, as described in detail in FIGS. 1 and 2A above.

At a 2D slice presentation step 102, processor 77 automatically selects, in 3D US image 40, and presents two or more 2D slices, such as 2D slices 47, 48 and 49, as described in detail in FIGS. 2A and 2B above. In some examples, physician 24 may check whether the selected 2D slices are suitable, and in other examples, physician 24 may manually select one or more of the 2D slices to be presented, e.g., over display device 27.

At a contour production step 104, processor 77 automatically selects two or more contours within two or more of the respective 2D slices. For example, processor 77 may automatically select contours 57, 58 and 59 within 2D slices 47, 48 and 49, respectively. In other examples, physician 24 may select at least one of contours 57, 58 and 59 manually. In both cases, processor 77 is configured to present contours 57-59 over 2D slices 47-49, respectively, as described in detail in FIG. 3A above. In other words, the 2D slices and the contours may be selected automatically by processor 77, or manually by a user (e.g., physician 24), or the selection may be carried out by any suitable combination of both physician 24 and processor 77 (e.g., processor 77 may recommend and physician 24 confirms the recommended selection).

At a second 3D US image production step 106 that concludes the method, processor 77 is configured to produce, based on the selected 2D contours (e.g., contours 57-59), second 3D US image 60 of volumetric ROI 66, and present second 3D US image 60 to physician 24, e.g., over display device 27.

Although the examples described herein mainly address using ultrasound for visualization of cavities and tissues in patient heart, the methods and systems described herein can also be used in other applications, such as in visualization of other cavities and/or tissues of any organs other than the heart. Moreover, the methods and systems described herein can also be used based on 3D images produced by other imaging and/or diagnostic systems having imaging modalities other than ultrasound, such as computerized tomography (CT) and magnetic resonance imaging (MRI).

Example 1

A system (10), including:

a processor (77), which is configured to: (i) receive a first three-dimensional (3D) ultrasound (US) image (40) of a volume of an organ (12) of a patient (23), (ii) present at least first and second two-dimensional (2D) slices (47, 48) selected in the first 3D US image, (iii) receive first and second 2D contours (57, 58) comprising a region of interest (ROI) (66) in the volume of the organ, which are selected in the first and second 2D slices (47, 48), respectively, and (iv) produce, based on the first and second 2D contours (57, 58), a second 3D US image (60) of the ROI (66); and a display (27), which is configured to present the second 3D US image (60) to a user.

Example 2

The system according to Example 1, wherein the processor is configured to: (i) receive signals indicative of US waves returned from tissue of the organ, and (ii) produce the first 3D US image based on the received signals.

Example 3

The system according to any of Examples 1-2, wherein the processor is configured to automatically select from the first 3D US image, at least one of the first and second 2D slices.

Example 4

The system according to any of Examples 1-2, wherein the processor is configured to receive a selection of at least one of the first and second 2D slices, and to present the selected 2D slices to the user.

Example 5

The system according to any of Examples 1-2, wherein the processor is configured to automatically select at least one of the first and second contours.

Example 6

The system according to any of Examples 1-2, wherein the processor is configured to present at least one of the first and second 2D contours over at least one of the first and second 2D slices, respectively.

Example 7

The system according to any of Examples 1-2, wherein the processor is configured to rotate the second 3D US image of the ROI, and to present the rotated second 3D US image to the user over the display.

Example 8

The system according to any of Examples 1-2, wherein the processor is configured to produce the second 3D US image within at least a portion of the first 3D US image, and wherein the display is configured to present to the user, the second 3D US image within at least the portion of the first 3D US image.

Example 9

The system according to any of Examples 1-2, wherein the display is configured to present over the second 3D US image, at least a marker indicative of at least one of the 2D slices.

Example 10

The system according to any of Examples 1-2, wherein the organ comprises a heart, and wherein the first and second 3D US images comprise at least one of a cavity and tissue of the heart.

Example 11

A method, including:

receiving a first three-dimensional (3D) ultrasound (US) image (60) of a volume of an organ (12) of a patient (23);

presenting at least first and second two-dimensional (2D) slices (47, 48) selected in the first 3D US image (40);

receiving first and second 2D contours (57, 58) comprising a region of interest (ROI) (66) in the volume of the organ, which are selected in the first and second 2D slices (47, 48), respectively;

producing, based on the first and second 2D contours (57, 58), a second 3D US image (60) of the ROI (66); and presenting the second 3D US image to a user.

It will be appreciated that the examples described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:

a processor, which is configured to: (i) receive a first three-dimensional (3D) ultrasound (US) image of a volume of an organ of a patient, (ii) present at least first and second two-dimensional (2D) slices selected in the first 3D US image, (iii) receive first and second 2D contours comprising a region of interest (ROI) in the volume of the organ, which are selected in the first and second 2D slices, respectively, and (iv) produce, based on the first and second 2D contours, a second 3D US image of the ROI, wherein the second 3D US image of the ROI is cropped from the first 3D US image; and a display, which is configured to present the second 3D US image to a user.

2. The system according to claim 1, wherein the processor is configured to:

(i) receive signals indicative of US waves returned from tissue of the organ, and (ii) produce the first 3D US image based on the received signals.

3. The system according to claim 1, wherein the processor is configured to automatically select from the first 3D US image, at least one of the first and second 2D slices.

4. The system according to claim 1, wherein the processor is configured to receive a selection of at least one of the first and second 2D slices, and to present the selected 2D slices to the user.

5. The system according to claim 1, wherein the processor is configured to automatically select at least one of the first and second contours.

6. The system according to claim 1, wherein the processor is configured to present at least one of the first and second 2D contours over at least one of the first and second 2D slices, respectively.

7. The system according to claim 1, wherein the processor is configured to rotate the second 3D US image of the ROI, and to present the rotated second 3D US image to the user over the display.

8. The system according to claim 1, wherein the processor is configured to produce the second 3D US image within at least a portion of the first 3D US image, and wherein the display is configured to present to the user, the second 3D US image within at least the portion of the first 3D US image.

9. The system according to claim 1, wherein the display is configured to present over the second 3D US image, at least a marker indicative of at least one of the 2D slices.

10. The system according to claim 1, wherein the organ comprises a heart, and wherein the first and second 3D US images comprise at least one of a cavity and tissue of the heart.

11. A method, comprising:

receiving a first three-dimensional (3D) ultrasound (US) image of a volume of an organ of a patient;

presenting at least first and second two-dimensional (2D) slices selected in the first 3D US image;

receiving first and second 2D contours comprising a region of interest (ROI) in the volume of the organ, which are selected in the first and second 2D slices, respectively;

producing, based on the first and second 2D contours, a second 3D US image of the ROI, wherein the second 3D US image of the ROI is cropped from the first 3D US image; and presenting the second 3D US image to a user.

12. The method according to claim 11, wherein receiving the first 3D US image comprises: (i) receiving signals indicative of US waves returned from tissue of the organ, and (ii) producing the first 3D US image based on the received signals.

13. The method according to claim 11, wherein presenting at least the first and second 2D slices comprises automatically selecting, from the first 3D US image, at least one of the first and second 2D slices, and presenting the one or more automatically selected 2D slices.

14. The method according to claim 11, wherein presenting at least the first and second 2D slices comprises receiving a selection of at least one of the first and second 2D slices, and presenting the selected 2D slices to the user.

15. The method according to claim 11, wherein receiving the first and second 2D contours comprises automatically selecting at least one of the first and second contours.

16. The method according to claim 11, and comprising presenting at least one of the first and second 2D contours over at least one of the first and second 2D slices, respectively.

17. The method according to claim 11, and comprising rotating the second 3D US image of the ROI, and presenting the rotated second 3D US image to the user over the display.

18. The method according to claim 11, wherein producing the second 3D US image comprises producing the second 3D US image within at least a portion of the first 3D US image, and presenting to the user, the second 3D US image within at least the portion of the first 3D US image.

19. The method according to claim 11, and comprising presenting, over the second 3D US image, at least a marker indicative of at least one of the 2D slices.

20. The method according to claim 11, wherein the organ comprises a heart, and wherein the first and second 3D US images comprise at least one of a cavity and tissue of the heart.

* * * * *